United States Patent Office

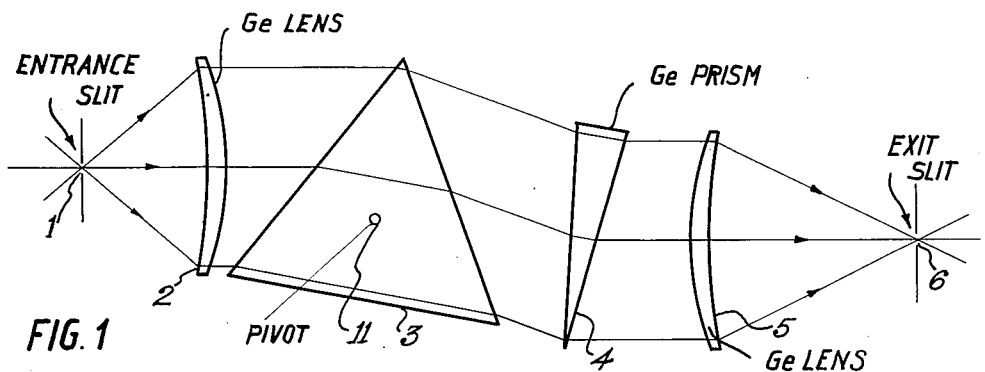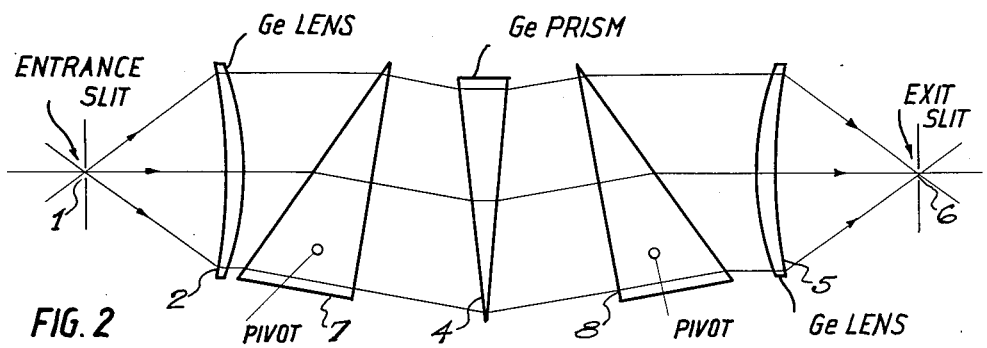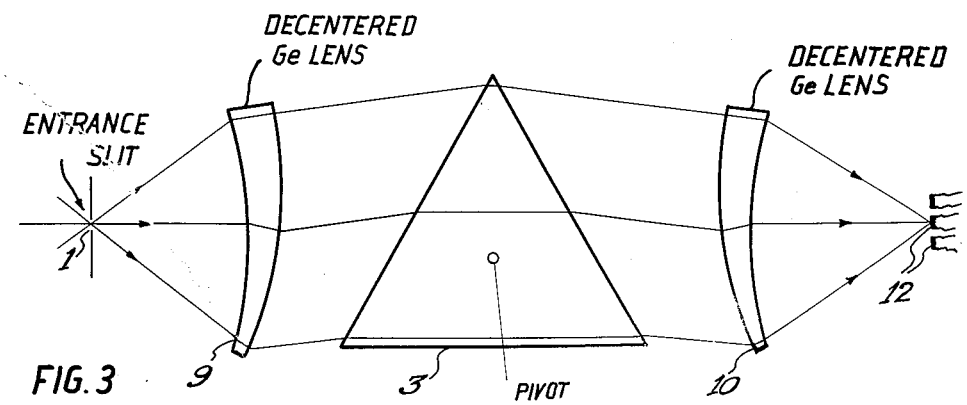

3,034,398
Patented May 15, 1962

3,034,398
IN-LINE INFRARED SPECTROMETER
Robert Bowling Barnes and Philip Wardham Collyer, Stamford, Conn., assignors to Barnes Engineering Company, Stamford, Conn., a corporation of Delaware
Filed June 7, 1960, Ser. No. 34,583
12 Claims. (Cl. 88—14)

This invention relates to infrared spectrometers of the parallel-axis and in-line type.

Spectrometric and spectroscopic instruments in the infrared present a series of problems which are not encountered in similar instruments for use in visible or ultraviolet light. These problems stem primarily from the fact that the practically used portion of the infrared spectrum covers a wavelength range which is enormous compared to visible light or ultraviolet. It is customary to consider the extent of spectral ranges in terms of octaves; that is to say, a range where the longest wavelength is twice that of the shortest is considered an octave. When examined from this standpoint, it will be seen that the visible spectrum is less than half an octave running from about $.4\mu$ to $.7\mu$. Similarly, the ultraviolet spectrum, which in practical use runs somewhat longer than $.2\mu$ to a litle over $.4\mu$, is also less than an octave. In the case of infrared the situation is quite different. Even if we disregard the very near infrared and consider the longer wave infrared from $2\mu$ to $32\mu$, this covers 4 octaves, or much more than ten times the range of the visible spectrum. This presents extreme optical problems and, as a result, for wide ranges of the infrared it has been necessary to use catoptric optics. This type of optics, while very efficient, does not lend itself to in-line design unless pierced mirrors are used.

Refractive optics which are standard in visible light instruments and in particular for ultraviolet spectrometric instruments have not been considered to be applicable to infrared spectrometers.

There is a great advantage in parallel-axis or completely in-line instruments as these permit incorporating spectrometric or monochromating means into other instruments in parallel mountings; for instance, sections of a tubular mount which is of the utmost practical importance, when a rugged instrument which can be easily aimed for field use is required. Two very effective solutions to this problem form the subject matter of the copending applications, Barnes and Collyer, Serial Nos. 848,297 (now Patent No. 2,995,973) and 3,568, filed October 23, 1959, and January 20, 1960, respectively. These solutions have opened up a field for in-line or parallel-axis instruments which was hitherto not available in the infrared but they too require pierced mirrors. As a result, a larger instrument results which although it can be used in the field and can be aimed, still presents some problems because of its size. For some uses, where weight and size are the critical factors, as in some airborne and satellite instruments, the larger size of the catoptric instruments referred to above places limitations on their use.

The present invention utilizes the extraordinary infrared properties of germanium and silicon to produce compact parallel-axis or completely in-line instruments which are light, rugged and usuable over a very broad band of infrared. The enormous refractive indices of these two materials, four for germanium and only somewhat less for silicon, permit production of very fast lenses of small curvature which are nearly free from spherical aberration. A much more important characteristic of germanium and silicon, which is used in the present invention, is the fact that for wavelengths somewhat longer than their short wave cutoff, the change of refractive index with wavelength is so slight that the materials can be considered as practically achromatic. The usefulness of the two elements depends on the portion of the infrared spectrum involved. Germanium is useful for practically any infrared radiations longer than 2 or $2.5\mu$, but in its presently available state of purity, silicon shows up abnormalities around $10\mu$ or beyond so that its usefulness is somewhat more restricted.

The enormous refractive indices of the two materials permit lenses and wedges of low curvature or angle which is of importance in minimizing reflection losses which would otherwise be a serious problem, even with antireflecting coatings, particularly for optics to be used over a very wide range of infrared.

Essentially the present invention utilizes germanium or silicon refractive optics and bending wedges of the same materials for straightening out the direction of dispersed rays. Instruments of adequate precision for infrared work over enormous ranges of wavelengths are thus made possible without sacrificing the great advantages of in-line or parallel-axis instruments. Lenses and wedges have been referred to above, but it should be understood that we are really referring to their functions and in certain modifications as will appear from a more detailed description below, a single element may perform both of these functions.

The invention will be described in greater detail in conjunction with the drawings which illustrate diagrammatically typical instruments and in which:

FIG. 1 is a diagram of a parallel-axis but not coincident-beam instrument;

FIG. 2 is a diagram of a completely in-line instrument; and

FIG. 3 is a diagram of a modified in-line instrument using fewer elements.

Since the present invention deals only with the optics which produce spectra and directly dispersed rays, it is illustrated in the drawing diagrammatically and it should be understood that in many instruments the configuration of the optics of the present invention are associated with other optical or electrical elements such as collecting optics, detectors and the like. As the invention is not concerned with these other elements, they are not illustrated in the drawings and it is an advantage that the present invention is extremely versatile and can be used, if necessary, as a plug-in element in a wide variety of infrared instruments.

In FIG. 1 incoming infrared radiation enters through an entrance aperture which is illustrated in the diagram as a slit 1. The radiation is then collimated by a lens 2 of germanium or silicon, passes through a dispersing prism 3 which is rotatable about an axis 11 and the particular dispersed beam selected is then bent by a germanium or silicon wedge 4 and is imaged on an exit slit 6 by the lens 5 which is also of germanium or silicon. The prism is shown in the minimum deviation position, and the radiation being transmitted to the exit slit at this setting is the shortest wavelength to be passed by the instrument; rotation of the prism can only bring longer wavelengths to the exit slit.

It will be noted that the selected ray leaving the slit 6 is parallel to the axis of the beam entering the instrument but it is offset slightly therefrom. This gives most of the advantages of an in-line instrument although not all. Thus since it is not possible to have both entrance and exit slits on the axis of the conventional housing (not shown), this housing which is usually in the form of a tube, is not completely free to be rotated and must therefore normally be oriented in a particular position. It is possible to permit rotation with respect to part of the optical path. For example, if it is necessary that the incoming beam be unaffected by rotation orientation of the instrument, the entrance slit may be on the axis of rotation of the housing. Conversely, if it is necessary that the emerging dispersed beams be unaffected by rotation, the exit slit or aperture may be on the longitudinal axis of the housing with the entrance slit offset. In every case there is the disadvantage, which in some instruments is of little significance but may be of great importance with other instruments, where minimum size and weight are prime considerations, that the housing has to be larger than the dimensions of the optical elements which it houses because it has to take care of the offsetting of the beams. Where insensitivity to rotation of either beam is not vital, the housing can be of minimum size and then the entrance and the exit slits or apertures are symmetrically displaced with respect to the longitudinal axis of the instrument housing.

FIGS. 2 and 3 avoid the above discussed minor, but nevertheless very real, disadvantages of the construction shown in FIG. 1. Both of these figures illustrates completely in-line instruments where the entrance and exit apertures are both on the optic axis of the instrument and, of course, the longitudinal axis of its housing. This permits instruments of minimum size and weight and they are not sensitive to rotational orientation except, of course, that the exit slit will define a spectrum in one direction and other orientational rotations will turn the spectrum without, however, displacing it. In the figures the same functional parts are given the same reference numerals.

Turning to FIG. 2 the entrance aperture or slit 1 and collimating lens 2 are the same as in FIG. 1. The collimating beam, however, instead of passing through a single prism passes through a half prism 7 made of suitable dispersing material; then the thin correcting wedge 4 of germanium or silicon; and finally a second dispersing prism 8. The selected dispersed beam is then imaged by lens 5 on exit slit 6 as in FIG. 1. However, this beam is centered on the optic axis of the instrument and is not offset as is the case with the instrument in FIG. 1.

It will be noted that additional advantages of complete in-line structure are obtained in FIG. 2 by the addition of an element over the construction shown in FIG. 1. There are now two dispersing prisms 7 and 8 instead of the single dispersing prism 3. The additional element is indeed a small price to pay for the improvements possible with a complete in-line operation and where such a type of instrument is needed. The construction of FIG. 2 is well worth its slight additional complexity.

FIG. 3 is a more sophisticated, completely in-line instrument. Not only does it not involve more elements than does FIG. 1, it involves one less element. As in FIG. 1 the incoming radiation enters through entrance slit 1 but the collimating lens is not a simple lens as in the case of FIGS. 1 and 2 but is a composite lens and wedge. The single element performs both the functions of a lens and wedge. The bending, however, is one-half as great as in the wedge 4 in FIG. 1, for reasons which will appear. After collimation and bending the beam passes through the dispersing prism 3 and then strikes a second element 10 which as in the case of 9 performs the functions both of an imaging lens and of a bending wedge. The elements of 9 and 10 are, of course, of either silicon or germanium and since there is a bending effect in both of them the amount of bending is only half as great in each as in the prism 4 in FIG. 1.

Instead of an exit slit, FIG. 3 illustrates an array of infrared detectors 12 arranged in the image plane. For purposes of illustration three are shown. Of course, any number may be present, each receiving a different dispersed wavelength. The substitution of an extended detecting plane for an exit slit or aperture and a single detector are well known devices in infrared spectrometers. They are different ways of performing the same result, and as it is an advantage of the present invention that it is extremely versatile and can be incorporated in any type of infrared spectrophotometric instrument, it may, of course, use any type of detection and so in FIG. 3 the other type of detection is illustrated. It should be understood that the exit aperture or slit 6 and detector arrays in the image planes are interchangeable and either can be used with the configuration of any of the FIGURES 1 to 3.

As has been pointed out above, the present invention is extremely versatile in infrared instruments and is not concerned wtih particular objects ahead of it and the particular detection and the process of signals following it. However, its versatility in a type of infrared instrument which is becoming increasingly important merits brief mention even though the invention is in no sense limited thereto. In many infrared instruments an area is scanned. This is effected, as far as the incoming beam is concerned, by moving collecting optics ahead of the spectrometer proper which forms the subject matter of the present invention. Sometimes the scanning is oscillatory and sometimes there is a rotating element which produces a conical scan. The present invention can, of course, be used with any of these conventional types. However, its compactness and insensitivity to rotational orientation makes it especially useful in compact instruments which use a conical scan. If the entrance aperture or slit is located on the longitudinal axis of the instrument, as the configuration of FIGS. 2 and 3, the conical scan does not interfere with the operation of the spectrometer in the slightest. The compact, in-line, scanning instrument can be produced with minimum weight and maximum ruggedness.

Another type of function of infrared instruments to which the present invention readily lends itself is a periodic scanning of different dispersed beams. Here again, the instrument lends itself to such operation without modification in design. Such a situation is illustrated in FIG. 3 where there are a series of infrared detectors in the image plane. In such a case spectral scanning can be effected electronically by successively sampling the signals from the different detectors 12. The same result may also be obtaiend by a plurality of exit slits or apertures with a single detector and scanning optics which image first one aperture and then the other on the detector. All of these detection means are completely conventional and it is an advantage that the present invention by its compact, in-line or parallel design lends itself well to use in a wide variety of instruments involving different types of spectra.

We claim:
1. In an infrared spectrometer the improvement which comprises monochromating means comprising in combination and optical alignment means for defining an inlet infrared beam, dioptric collimating means composed of an element selected from the group consisting of germanium and silicon, prismatic dispersing means, achromatic prismatic refracting means composed of an element selected from the group consisting of germanium and silicon and imaging means composed of an element selected from the group consisting of germanium and silicon for imaging at least one dispersed beam on a predetermined image plane said beam being parallel to the optic axis of the instrument.

2. A spectrometer according to claim 1 in which the refracting means are of germanium.

3. A spectrometer according to claim 1 in which the refracting means are of silicon.

4. An in-line infrared spectrometer according to claim 1 comprising in combination two prismatic dispersing means and an achromatic prismatic refracting means between the two dispersing prismatic means composed of an element selected from the group consisting of germanium and silicon, the dimensions of the three prismatic means and their arrangement resulting in imaging at least one dispersed beam parallel to and constituting an extension of the inlet beam.

5. A spectrometer according to claim 4 in which the achromatic prismatic refracting means is of germanium.

6. A spectrometer according to claim 4 in which the achromatic prismatic refracting means is silicon.

7. An in-line infrared spectrometer according to claim 1 comprising in combination a single prismatic dispersing means and two achromatic prismatic refracting means on either side thereof composed of an element selected from the group consisting of germanium and silicon, the arrangement and dimensions of the three prismatic means imaging at least one dispersed line parallel to and an extension of the inlet beam.

8. An in-line spectrometer according to claim 7 in which the achromatic prismatic refracting means are provided with dioptric power so that they act both as achromatic prismatic refracting means and as collimating and imaging lenses respectively.

9. An in-line spectrometer according to claim 8 in which the achromatic prismatic refracting means are composed of germanium.

10. An in-line spectrometer according to claim 8 in which the achromatic prismatic refracting means are composed of silicon.

11. A spectrometer according to claim 7 in which the achromatic prismatic refracting means is of germanium.

12. A spectrometer according to claim 7 in which the achromatic prismatic refracting means is of silicon.

References Cited in the file of this patent

UNITED STATES PATENTS

| | | |
|---|---|---|
| 2,408,512 | Gradisar | Oct. 1, 1946 |
| 2,659,271 | Trueting | Nov. 17, 1953 |